No. 837,691.
PATENTED DEC. 4, 1906.
F. A. LAKE.
HAY BALER POWER.
APPLICATION FILED JUNE 2, 1906.
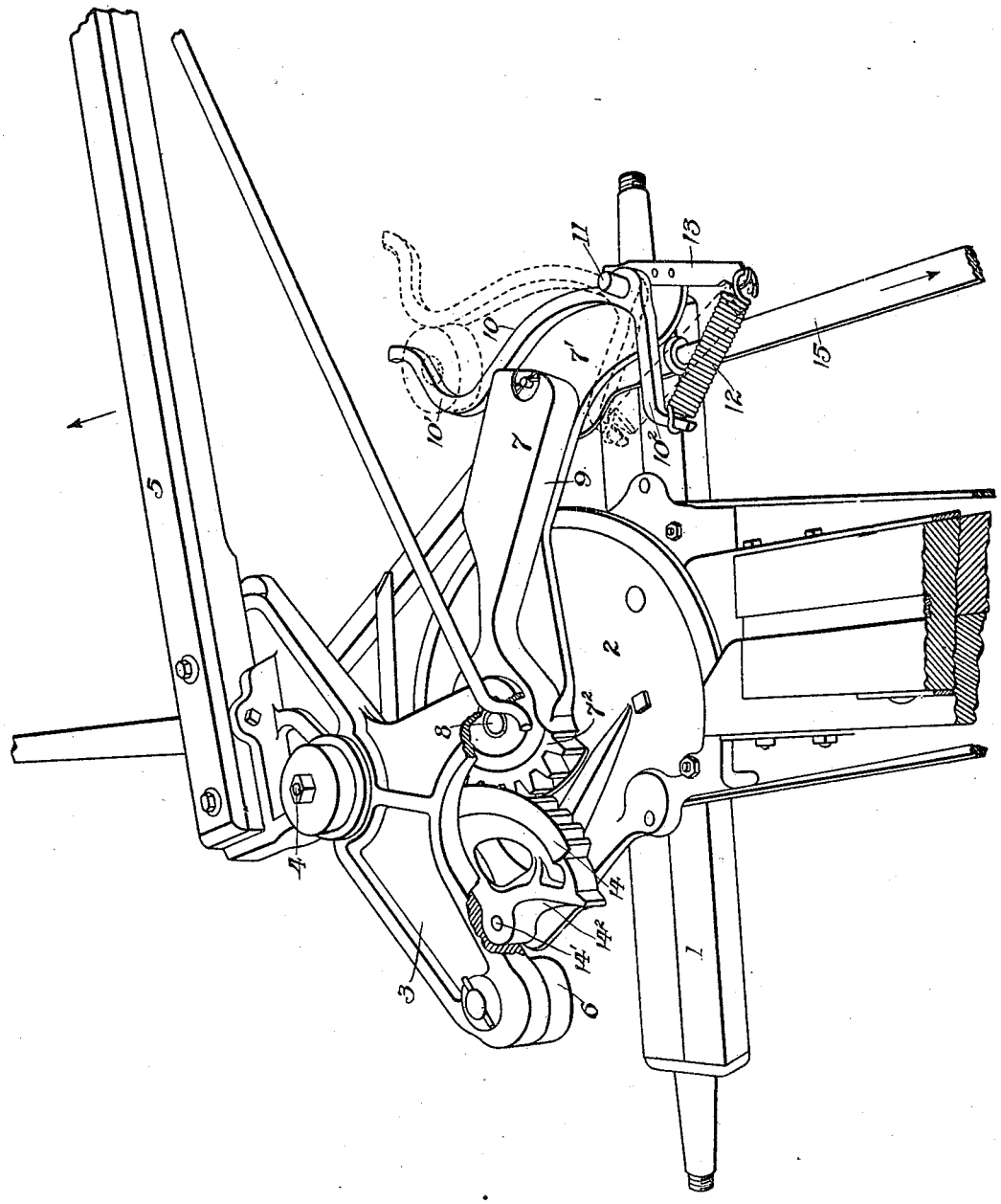
Witnesses:
F. W. Hoffmeister.
F. M. Daggett.
Inventor
Frank A. Lake.
By J. C. Warner,
Attorney.

UNITED STATES PATENT OFFICE.

FRANK A. LAKE, OF SPRINGFIELD, OHIO, ASSIGNOR TO INTERNATIONAL HARVESTER COMPANY, A CORPORATION OF NEW JERSEY.

HAY-BALER POWER.

No. 837,691.

Specification of Letters Patent.

Patented Dec. 4, 1906.

Application filed June 2, 1906. Serial No. 319,825.

*To all whom it may concern:*

Be it known that I, FRANK A. LAKE, a citizen of the United States, residing at Springfield, in the county of Clark and State of Ohio, have invented a new and useful Improvement in a Hay-Baler Power, of which the following is a complete specification.

This invention relates to the power mechanism for balers operated by horse-power, and more particularly to means for absorbing the shock occasioned by the rebound of the plunger.

The improvement is applied to a "pull-press," by which is meant a press in which the plunger is pulled instead of pushed; and the object in view is to prevent the sudden release and consequent shock of the power-arm by the sweep-arm, and thereby avoid breaking of the power-arm or other parts.

The preferred form of the improvement is embodied in the accompanying drawing, in which is shown a plan perspective of the principal parts of a horse-power for balers, illustrating the application of the said improvement.

In the drawing, 1 designates the axle on which the power-frame 2 is mounted, the supporting-wheels for said axle not being shown. A sweep-arm 3 is pivotally mounted on the frame 2, its pivotal axis being at 4, and to this sweep-arm is secured the sweep-lever 5. A roller 6 is journaled on the end of the sweep-arm 3, this roller constituting the point of engagement between the said sweep-arm and the power-arm 7. The power-arm 7, which is pivotally mounted on the frame 2 at 8, is provided with a cam-surface 9, adapted to be impinged by the roller 6. An extension 7' of the power-arm 7 projects outwardly from the outer end thereof, and on this extension is mounted the yieldingly-held cushioning-lever 10, which in conjunction with the end of the power-arm 7 forms a gate through which the roller 6 passes as it leaves the cam-surface 9. The lever 10 pivots at 11, and the long or roller-engaging end 10' thereof is bent, as shown, to form a curved track for the rollers 6 on the sweep-arm 3. The other end of the lever 10 deflects sharply from near its pivotal axis, and a tension-spring 12 is interposed between the bent end $10^2$ of the lever 10 and an arm 13, which is secured to and projects outwardly from the end of extension 7' of the power-arm 7.

A gear-segment $7^2$ is formed on the arm 7, and another independently-mounted gear-segment 14, pivoted at 14', meshes therewith. The segment 14 is provided with a cam-surface $14^2$, adapted to be engaged by the roller 6 and in this manner cause the positive return of the plunger through the power-arm 7 and the plunger draw-bar 15 in a manner familiar to those acquainted in this art.

The operation of the device is obvious. As the sweep 5 is drawn in the direction of the arrow the rollers 6 (the one beneath the sweep 5 not being shown) on leaving the cam-surface 9 will be brought into contact with the yielding gate or lever 10. The stress in the draw-bar 15 being in the direction of the arrow and produced by the elasticity in the charge of hay will draw the arm 7 rearwardly or toward the bottom of the drawing, and the roller 6 will be forced through the gate 10, or rather the gate will retard the return of the plunger and absorb the shock. In this manner the gate or lever 10 forms a yielding engagement with the sweep-lever 3 after the normal contact between the said lever and power-arm 7 has ceased. The force of the rebound is taken up by the sweep 5, but is a rearward pull thereon instead of a forward thrust. The sweep is thus not thrown forward, as is usual in such construction, and the doubletrees and neck-yoke are prevented from injuring the draft-horses. The rearward pull on the sweep 5 as the lever 10 is being drawn past the roller 6 is relatively slight and entirely without objection.

What I claim as my invention, and desire to secure by Letters Patent, is—

1. In a power mechanism for hay-balers, in combination, a power-frame, a power-arm pivotally mounted thereon, a sweep-lever for actuating said arm, a draw-bar, and means mounted on said power-arm for yieldingly engaging the sweep-lever and absorbing the shock accompanying said arm's return.

2. In a power mechanism for hay-balers, in combination, a power-frame, a power-arm pivotally mounted thereon, a sweep-lever for actuating said arm, a draw-bar, and means arranged to form a yielding engagement between the said sweep-lever and power-arm after the normal contact between these members has ceased.

3. In a power mechanism for hay-balers, in combination, a power-frame, a sweep and sweep-arm pivotally mounted thereon, a power-arm provided with a cam-surface adapted to be engaged by said sweep-arm, and a yieldingly-held lever pivotally mounted on said power-arm and arranged to be impinged by the sweep-arm after said sweep-arm has disengaged the power-arm.

4. In a power mechanism for hay-balers, in combination, a power-frame, a sweep and sweep-arm pivotally mounted thereon, a power-arm eccentrically mounted with respect to the sweep, said arm having a cam-surface in connection therewith adapted to be impinged by said sweep-arm, a cushioning-lever pivotally mounted on the end of said power-arm and arranged to be contacted when in normal position by the engaging point on the said sweep-arm after said engaging point has left the cam-surface on the power-arm, and a spring for holding said cushioning lever normally and yieldingly in the path of travel of the engaging-point on the sweep-arm.

FRANK A. LAKE.

Witnesses:
W. H. GUTHRIE,
C. C. ROOTS.